Aug. 27, 1935.  D. A. GILLEN  2,012,873
MANUAL AND AUTOMATIC SAFETY GAS APPLIANCE
Filed April 25, 1934   2 Sheets-Sheet 2
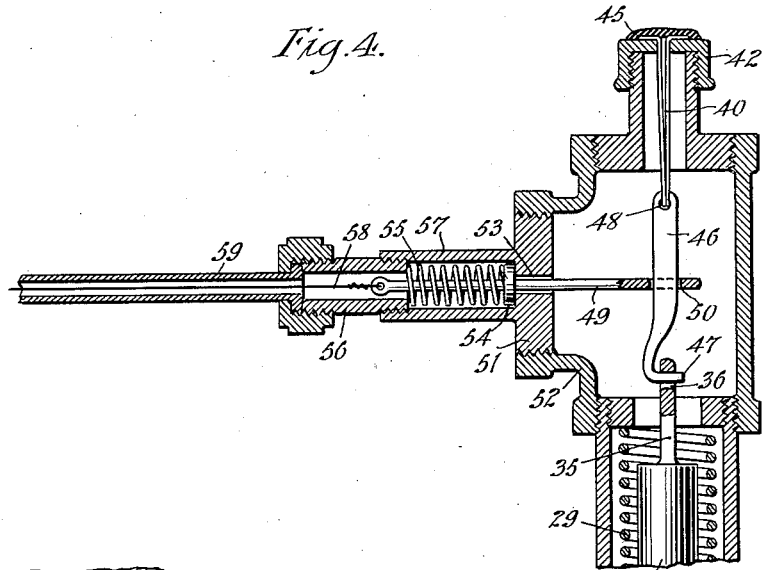
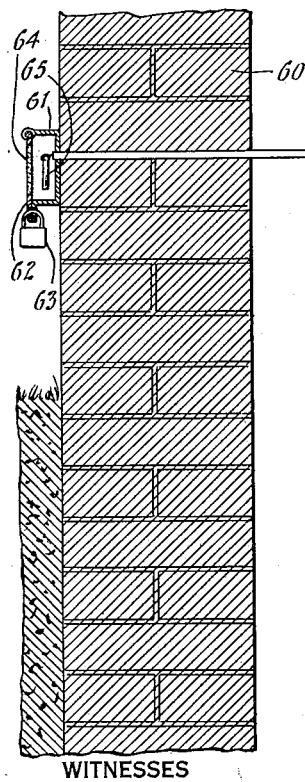
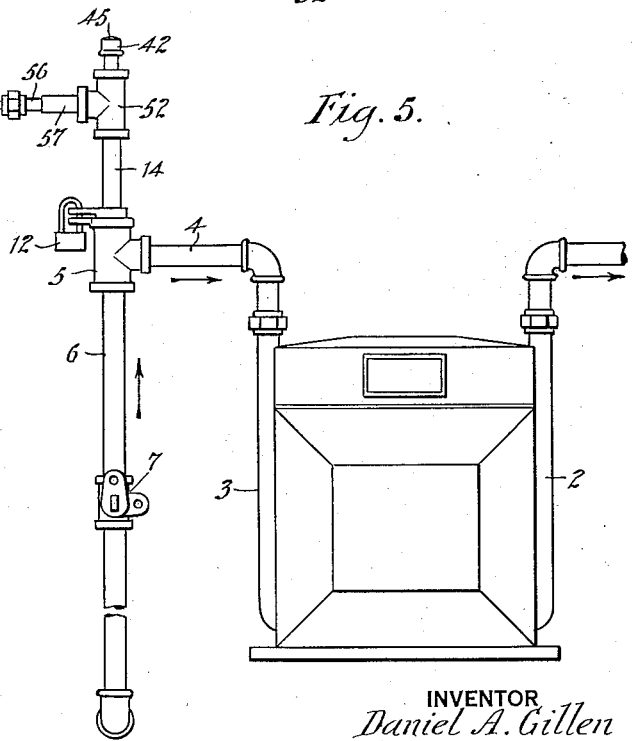
INVENTOR
Daniel A. Gillen Patented Aug. 27, 1935

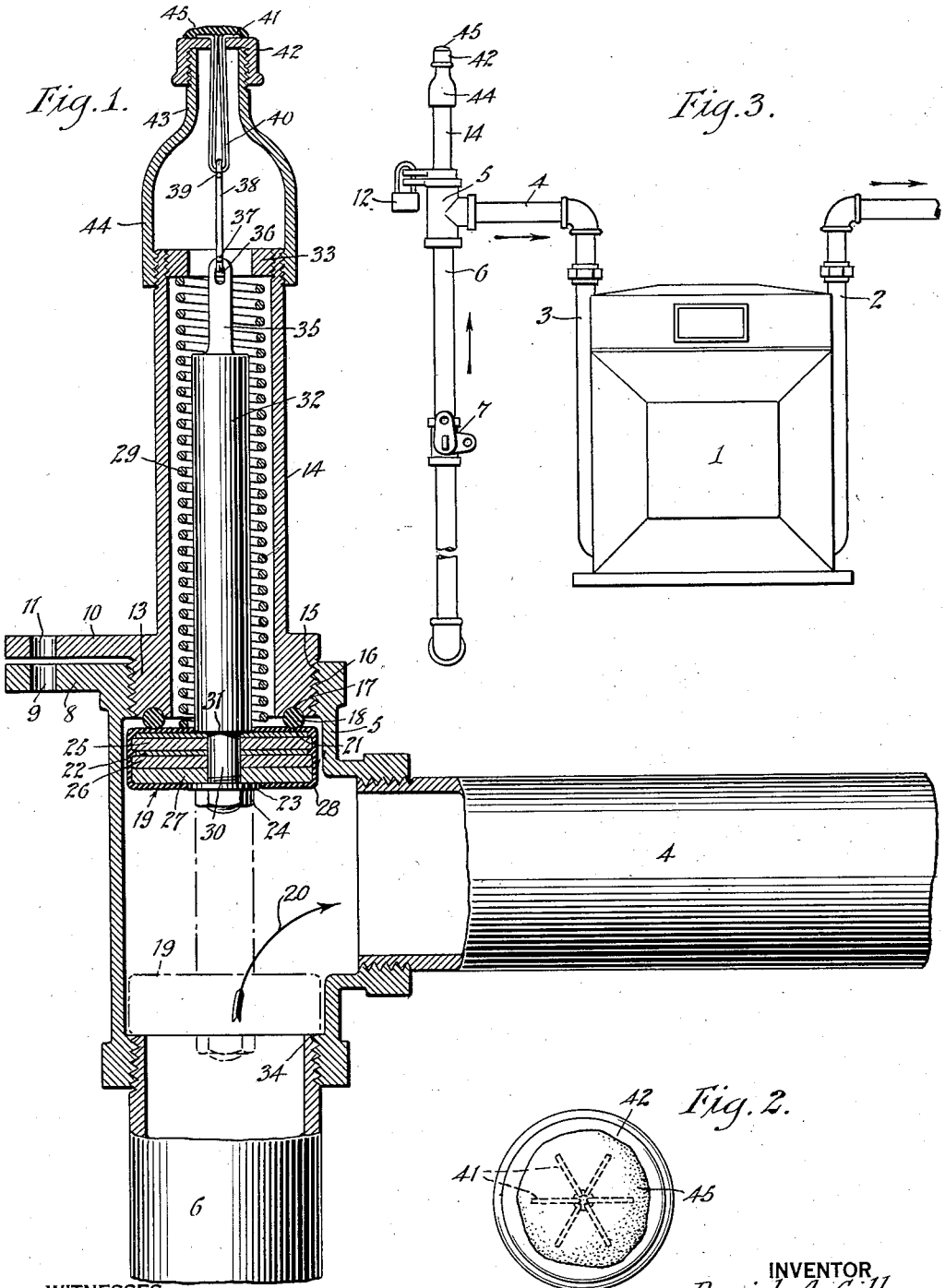

2,012,873

UNITED STATES PATENT OFFICE 2,012,873

MANUAL AND AUTOMATIC SAFETY GAS APPLIANCE

Daniel A. Gillen, Flushing, N. Y.

Application April 25, 1934, Serial No. 722,394

2 Claims. (Cl. 137—162)

This invention relates to a manual and automatic safety gas appliance, the object being to provide a construction which is comparatively inexpensive and which may be easily applied to gas pipes in a dwelling or other building so that it may be manually actuated for shutting off the gas in case of fire.

Another object of the present invention is to provide a shut-off structure for gas mains which may be actuated automatically when the temperature is raised a predetermined extent, or which may be manually actuated at any time, whereby the gas supply pipe is closed.

A further object, more specifically, is to provide a shut-off device for a gas supply pipe immediately before the gas enters the meter, the construction being such that it may be applied to an ordinary T-fitting now used in systems of this kind, or to a special fitting as preferred.

In the accompanying drawings—

Figure 1 is a longitudinal vertical sectional view through a device embodying the invention; part of a lead-in and a lead-out pipe being shown in connection therewith;

Figure 2 is a top plan view of the fuse member and associated parts shown in Figure 1;

Figure 3 is an elevation showing the gas meter with a supply pipe and an outlet pipe, and an appliance embodying the invention associated therewith;

Figure 4 is a view similar to the upper part of Figure 1, except that it shows a modified construction wherein the parts may be released manually;

Figure 5 is a view similar to Figure 3 but illustrating how the manual releasing mechanism may extend to a distant point.

Referring to the accompanying drawings by numerals, 1 indicates a gas meter of the usual kind, having the usual outlet pipe 2, and the usual inlet pipe 3. Pipe 2 leads to the usual gas jets and other devices using gas, while the inlet pipe 3 is connected through a series of pipes, 4, to the T-fitting 5, which in turn is connected to the principal inlet main 6. This main may be provided with the usual shut-off valve 7.

The parts just described are old and well known and, in addition, there is usually a plug for closing the upper end of the T-fitting 5. This T-fitting may be of the conventional kind or may be made special as shown in Figs. 1 and 3, wherein there is formed an integral extension 8 having an aperture 9. This extension coacts with the extension 10 having the aperture 11 for receiving the bolt of a lock 12. Extension 10 forms part of the enlargement 13 of the housing 14. The enlargement 13 as shown in Fig. 1 is provided with threads 15 adapted to be interlocked with the threads 16 in the upper part of the T-fitting 5. A groove 17 is formed at the lower end of the enlargement 13 for receiving the gasket 18, which may be of rubber or other material, and against which the head 19 continually presses when the same is in its normal position, as illustrated in Fig. 1. When the head 19 is in normal position gas may flow as indicated by the arrow 20, said gas flowing from the supply main 6 to the meter 1 and thence out to the various outlets. In case of a fire the head 19 is released and quickly moves downwardly to the position shown in dotted lines in Fig. 1, whereupon the main supply pipe 6 is closed.

The head 19 is formed with plates 21 and 22 of metal, and also a metal washer 23 coacting with a nut 24 for clamping the plates 21 and 22 in place, and also the discs 25, 26 and 27 in place. Disc 25 is preferably made from magnesium and disc 26 is also made from the same material, while disc 27 is of asbestos, preferably asbestos cloth. All of these plates are covered by a graphite paste 28, whereby the head will be comparatively soft and yet strong enough to provide a proper seal for the pipe 6 when functioning. The upper end of pipe 6 may be smooth or may be rough and yet, by reason of the graphite and other soft parts of the head, an efficient seal will be produced when the spring 29 forces the head 19 into the dotted position shown in Fig. 1. It will be noted that the head 19 surrounds the reduced extension 30 and that plate 21 rests against the shoulder 31 so that the nut 24 may properly clamp the parts together. The reduced extension 30 is preferably integral with the shaft 32 which is surrounded by the spring 29, said spring resting on the head 19 and against the interior bushing 33, said bushing being carried at the upper end of the housing 14.

When the parts are in what may be termed a non-functioning position, the spring 29 is under considerable tension, and when the head is released said spring will quickly force the head downwardly and press it continually against the upper end of pipe 6, or if this pipe does not extend in far enough to be engaged by the head, it will press against shoulder 34 of the T-fitting 5.

At the upper end the rod 32 is provided with a reduced extension 35 having a comparatively large opening 36 through which the hook 37 extends, said hook being preferably integral with the rod 38, which has a second hook 39 passing through a loop 40 of small wires. These wires may be of any material and are preferably small copper wires with their ends 41 spread out on top of the cap 42, which cap is screwed onto the reduced end 43 of the fitting 44, which fitting is screwed onto the upper end of housing 14. After the ends 41 have been bent over as shown in Fig. 1, a fusible metal 45 is dropped thereon while in a molten state and is allowed to solidify. This anchors the loop 40 and gives ample anchorage for supporting the rod 32 and the head 19, notwithstanding the action of the spring 29. There are a large number of small wires in loop 40 and, consequently, each end 41 is independently soldered in place by the fusible metal which may be made to fuse at any desired temperature. By this construction a fusible metal, which will fuse at 150° F., may be safely used and will hold up the parts for many years without danger of breakage. It will, of course, be evident that a stronger fusible metal may be used, if desired, though ordinarily it has been found that from 140° to 150° F., or thereabouts, is most practicable.

In case of a fire the fusible metal will melt and immediately the spring 29 will force all the parts downwardly quickly to the dotted position shown in Fig. 1, whereupon the gas is shut off.

In many cases it is desired to shut off the gas manually and also from a distant point. Where there is no particular hurry, or where there is no fire, the gas may be readily shut off by moving the valve 7 to a closed position. However, when there is a fire in the building and the fire is at a distant point from the meter, the gas pipes at or adjacent the fire may be opened and discharge gas directly into the fire. To insure against this action, or to prevent it, the firemen as soon as they reach the scene of the fire may manually shut off the gas by the construction shown in Figs. 4 and 5. In these figures the same construction is shown as in Fig. 1, except for certain parts which will now be described.

As illustrated in Fig. 4, instead of having two hook members, namely, members 37 and 39, there is provided a small bar 46 having a right angled extension 47 extending through the opening 36 of the extension 35. The bar 46 is provided with an aperture 48 through which the wire loop 40 extends. By this arrangement whenever the fusible metal 45 is fused the parts will automatically function to shut off the gas. However, there is also provided a bar 49 having an eye 50 surrounding bar 46. Bar 49 extends through the fitting 51 screwed into the T-fitting 52 which is used instead of the fitting 44, as shown in Fig. 1. Bar 49 extends loosely through the aperture 53 and has an abutment 54 rigidly secured thereto so that the spring 55 may press continually against the same to hold the parts in the position shown in Figure 4. The spring 55 also acts against the end of the nipple 56, said spring and associated parts being in the tubular extension 57 shown as integral with the fitting 51, though it could be made separate and secured thereto. A wire or cable 58 is connected to the outer end of the bar 49 and extends through a suitable protecting pipe 59 to any desired point, as for instance, to the wall 60 of the building and into the metal box 61. This box has a door 62 which may be locked by a suitable lock 63. In the door 62 there is provided a glass panel 64 which may be broken at any time and the ring 65 grasped and pulled, said ring being connected to the wire or cable 58. When the ring 65 is pulled bar 50 will be moved to the left as shown in Fig. 4 against the action of the spring 55 and will swing bar 46 until the hook end 47 is disengaged from the eye 36. This will allow spring 29 to force the rod 32 and associated parts downwardly to the dotted position shown in Fig. 1. After the fire has been extinguished some employee from the gas company must remove the appliance and substitute a new one. All that is necessary is to remove the lock 12 in case the same is in use and then unscrew the enlargement 13. The entire device is then removed and a new one substituted, where the automatic structure shown in Fig. 1 is used. Where the structure shown in Fig. 4 is used, the same action takes place except that the wire 58 must be secured to the bar 49. This may be readily done when the nipple 56 is being applied.

It will be understood that in the form of the invention shown in Figs. 4 and 5 the device will operate automatically in case the heat is sufficiently great near the device to melt the fusible metal 45. However, if this metal is not fused the device will not operate until it is actuated manually as above set forth.

I claim:

1. In a gas shut-off device for gas supply systems, a T-fitting adapted to receive the end of a supply pipe at one end of the fitting, and a vending pipe at one side of the fitting, a housing screwed into the end of the fitting opposite the supply pipe, a rod extending through said housing, a head formed principally of soft material carried by said rod at the lower end and arranged wholly within said fitting, a spring arranged in said housing and surrounding said rod, said spring acting against said head to cause the same to move downwardly and press the head against the end of said supply pipe carried by said fitting, a gasket arranged between said head and said housing to prevent leakage when the head is in non-functioning position, and means for holding the head in non-functioning position, said means including a plurality of strands of wire connected with said rod, said wires at one end being spread over the upper part of said housing, and a fusible member engaging each strand of wire and the housing for holding the wires against movement until the fusible member has been fused, whereupon the wires will be released and said spring caused to function.

2. In a gas shut-off device for gas supply systems, a head for closing the supply pipe to said system, a spring for actuating said head, a rod having an apertured upper end, said rod being rigidly connected with said head and acting to hold the head against actuation by said spring, means including a fusible structure, and a swinging hook supported by said fusible structure for preventing said rod from moving in one direction, said swinging hook member having a portion extending through the apertured upper end of said rod, an apertured bar positioned so that the swinging hook will slidingly extend therethrough, and a manually actuated member for swinging said hook so that it will be moved away from said rod whereby said rod will be released and said spring will be allowed to function.

DANIEL A. GILLEN.